US011936133B2

(12) United States Patent
Maegawa et al.

(10) Patent No.: US 11,936,133 B2
(45) Date of Patent: Mar. 19, 2024

(54) HERMETIC TERMINAL AND PRESSURE-RESISTANT CONTAINER

(71) Applicant: SCHOTT AG, Mainz (DE)

(72) Inventors: Yusuke Maegawa, Koka (JP); Hiroki Honda, Koka (JP); Akira Fujioka, Koka (JP); Daisuke Fukushima, Koka (JP)

(73) Assignee: SCHOTT AG, Mainz (DE)

( * ) Notice: Subject to any disclaimer, the term of this patent is extended or adjusted under 35 U.S.C. 154(b) by 477 days.

(21) Appl. No.: 17/283,106

(22) PCT Filed: Feb. 18, 2020

(86) PCT No.: PCT/JP2020/006206
§ 371 (c)(1),
(2) Date: Apr. 6, 2021

(87) PCT Pub. No.: WO2020/171048
PCT Pub. Date: Aug. 27, 2020

(65) Prior Publication Data
US 2021/0344139 A1    Nov. 4, 2021

(30) Foreign Application Priority Data
Feb. 19, 2019    (JP) .................. 2019-027673

(51) Int. Cl.
*H01R 13/533*    (2006.01)
*B60H 1/00*    (2006.01)
(Continued)

(52) U.S. Cl.
CPC ....... *H01R 13/533* (2013.01); *B60H 1/00642* (2013.01); *H01R 13/405* (2013.01);
(Continued)

(58) Field of Classification Search
CPC .. H01R 13/533; H01R 13/405; H01R 13/521; H01R 13/5219; H01R 13/5202;
(Continued)

(56) References Cited

U.S. PATENT DOCUMENTS 4,984,973 A      1/1991  Itameri-Kinter et al.
8,547,196 B2 *  10/2013  Higashikata ........... H01H 37/54
                                                          337/380
(Continued)

FOREIGN PATENT DOCUMENTS

CN    104066987 A    9/2014
CN    105375129 A    3/2016
(Continued)

OTHER PUBLICATIONS

Official Communication issued in corresponding Japanese Patent Application No. 2019-027673, dated Oct. 5, 2021.
(Continued)

*Primary Examiner* — Michael C Zarroli
(74) *Attorney, Agent, or Firm* — Keating & Bennett, LLP (57) ABSTRACT

The hermetic terminal includes a metal base that is provided with at least one sealing hole, a lead that is inserted in the sealing hole provided on the metal base, an insulating material that hermetically seals the metal base and the lead, and a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container.

28 Claims, 3 Drawing Sheets

(51) Int. Cl.
   *H01R 13/405*    (2006.01)
   *H01R 13/453*    (2006.01)
   *H01R 13/52*     (2006.01)
   *H02G 3/14*      (2006.01)
   *H02K 5/10*      (2006.01)
   *H02K 5/22*      (2006.01)
   *H02K 9/00*      (2006.01)
   *H01R 13/74*     (2006.01)

(52) U.S. Cl.
   CPC ....... *H01R 13/521* (2013.01); *H01R 13/5219* (2013.01); *H02K 5/10* (2013.01); *H02K 5/225* (2013.01); *H02K 9/00* (2013.01); *H01R 13/5202* (2013.01); *H01R 13/748* (2013.01)

(58) Field of Classification Search
   CPC .... H01R 13/748; H01R 13/5216; H01R 9/16; H01R 43/20; B60H 1/00642; H02K 5/10; H02K 5/225; H02K 9/00; F04B 39/123; F04B 35/04; F04B 39/00; F16J 15/064; F16J 15/102; F16J 15/10; H01B 3/441; H01B 3/445; H01B 3/28; H01B 3/40; H01B 3/44; H01B 17/58; H02G 3/088; H02G 15/013
   See application file for complete search history.

(56) References Cited

U.S. PATENT DOCUMENTS

| | | | |
|---|---|---|---|
| 2012/0018216 | A1 | 1/2012 | Harada et al. |
| 2014/0375157 | A1 | 12/2014 | Taguchi et al. |
| 2019/0052144 | A1 | 2/2019 | Heo et al. |
| 2020/0395807 | A1 | 12/2020 | Heo et al. |

FOREIGN PATENT DOCUMENTS

| | | |
|---|---|---|
| CN | 2060987690 | 4/2017 |
| CN | 207282748 U | 4/2018 |
| JP | 51-009697 Y | 3/1976 |
| JP | 03-114582 U | 11/1991 |
| JP | 04-132885 A | 5/1992 |
| JP | 05-144493 A | 6/1993 |
| JP | 06-185463 A | 7/1994 |
| JP | H08-135572 A | 5/1996 |
| JP | 3114582 U | 10/2005 |
| JP | 2010-168914 A | 8/2010 |
| JP | 2013-148037 A | 8/2013 |
| JP | 2015-183668 A | 10/2015 |
| JP | 2015-187963 A | 10/2015 |
| KR | 10-2017-0120775 A | 11/2017 |
| KR | 10-2018-0028304 A | 3/2018 |
| WO | WO 2010/117000 | 10/2010 |
| WO | 2021/066428 A1 | 4/2021 |

OTHER PUBLICATIONS

PCT Examiner Yukari Nakamura, PCT International Preliminary Report on Patentability including English Translation of PCT Written Opinion of the International Searching Authority for International Application PCT/JP2020/006206, dated Aug. 10, 2021, 14 pages, International Bureau of WIPO, Geneva, Switzerland.

English translation of the International Search Report of the International Searching Authority for International Application PCT/JP2020/006206, dated May 19, 2020, 3 pages, Japan Patent Office, Tokyo, Japan.

Official Communication issued in corresponding Chinese Patent Application No. 202080005599.1, dated May 16, 2022.

"Technical Storage Regulations for Railway Materials", The Ministry of Railways of the People's Republic of China, People's Railway Press, Jun. 30, 1979, 7 pages.

Jian et al., "Modern Lubrication Technique", Metallurgical Industry Press, Jan. 31, 2008, 8 pages.

Wenying et al., "Heat Conductive Polymer Composites", National Defense Industry Press, Jun. 30, 2017, 8 pages.

Umeno et al., "Styrene-butadiene Rubber Processing Technology", Chemical Industry Press, Jun. 20, 1983, 7 pages.

"Plastic and Rubber Processing Agents", Shanxi Institute of Chemical Industry, Chemical Industry Press, May 31, 1983, 11 pages.

* cited by examiner

HERMETIC TERMINAL AND PRESSURE-RESISTANT CONTAINER

TECHNICAL FIELD

The present disclosure relates to a hermetic terminal and a pressure-resistant container equipped with the same.

BACKGROUND ART

A hermetic terminal refers to such a terminal that a lead is hermetically sealed in an eyelet or an insertion hole provided on a metal base by using an insulating material made of glass. The hermetic terminal is used to supply a current to an electric device or an element accommodated in a hermetic container, or transmit a signal from the electric device or the element to the outside. For example, WO2010/117000 (PTL 1) discloses a hermetic terminal to be used in a compressor for a refrigerator or an air conditioner. The hermetic terminal disclosed in PTL 1 is provided with a metal base that includes a top plate, a pipe extending downward from an outer peripheral end of the top plate, a flange extending obliquely outward from a lower end of the tube, and three circular holes extending inward from the top plate, each of which forms a lead sealing hole. The lead is hermetically sealed in the lead sealing hole provided on the metal base by using a glass insulating material.

In a hybrid vehicle, in order to reduce the environmental influence caused by an engine, the engine is stopped when the vehicle is temporarily stopped by a traffic signal or the like. In this case, if the compressor is driven by the engine, the air conditioning is stopped every time when the vehicle is stopped, which is not preferred in summer or winter, and particularly in an extremely cold or extremely hot climate.

In a hybrid vehicle or an electric vehicle, a compressor driven by an electric motor may be used instead of the compressor driven by an engine. When the compressor is driven by an electric motor, similar to the case of an indoor air conditioner, the compressor is sealed in a hermetic container together with the electric motor. In order to install the vehicular compressor in a narrow engine room together with the electric motor, it is preferable that the compressor is as small as possible in space and as light as possible in weight. The electric motor is driven by electric power supplied through a hermetic terminal fixed in a terminal fixing hole provided on the hermetic container. As disclosed in CN206098769U (PTL 2), for example, in order to save space, pins of the hermetic terminal are arranged linearly (in a line).

CITATION LIST

Patent Literature

PTL 1: WO2010/117000
PTL 2: CN206098769U

SUMMARY OF INVENTION

Technical Problem

In the vehicular compressor driven by an electric motor, a hermetic terminal is fixed in a terminal fixing hole provided on the hermetic container accommodating refrigerant, lubricating oil, and the electric motor. Electric power is supplied from a power source through the hermetic terminal to the electric motor, and the electric motor uses the electric power to compress and circulate refrigerant so as to perform heat exchange between the inside and the outside of the vehicle. Thus, the hermetic terminal comes into contact with the refrigerant inside the container, and thereby, the metal surface of the hermetic terminal is cooled, which makes dew drops to be formed on the surface of the lead or the metal base of the hermetic terminal located outside the container. Dew drops are not preferred in terms of electrical insulation. However, a conventional hermetic terminal is not configured to prevent dew drops from being formed on the surface of the lead or the metal base.

Conventionally, in a hermetic terminal for a refrigerator, in order to improve electrical insulation, an insulating coat such as silicone rubber is provided on the metal base and the lead located outside the container. Silicone rubber does not have refrigerant resistance and oil resistance, and thereby cannot be applied to the inside of the container.

An object of the present disclosure is to provide a hermetic terminal capable of preventing dew drops from being formed on an outer surface thereof and a pressure-resistant container equipped with the hermetic terminal for a vehicular electric compressor.

Solution to Problem

According to an embodiment of the present disclosure, a hermetic terminal includes: a metal base that is provided with at least one sealing hole; a lead that is inserted in the sealing hole provided on the metal base; an insulating material that hermetically seals the metal base and the lead; and a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container.

By covering the exposed surface of the hermetic terminal located inside the pressure-resistant container with the heat insulating member, the metal surface of the hermetic terminal is prevented from coming into contact with the refrigerant. Since the inner surface of the metal base or the lead is not directly cooled by the refrigerant, it is possible to prevent dew drops from being formed on the outer surface of the hermetic terminal.

The heat insulating member may be made of an electrical insulating material having refrigerant resistance and oil resistance.

The heat insulating member may be made of a material selected from rubber, elastomer and plastic, or a composite material or a composite structural material containing the material selected from rubber, elastomer and plastic.

The heat insulating member may be made of plastic selected from epoxy resin and polytetrafluoroethylene resin (PTFE).

The heat insulating member may be made of rubber selected from hydrogenated nitrile butadiene rubber (HNBR) and ethylene-propylene-diene monomer (EPDM).

The rubber constituting the heat insulating member may be carbon black free or contain a very small amount of carbon black.

The rubber may be formulated with at least one inorganic filler selected from silica and magnesium silicate in an amount of 1 to 5% by mass.

The rubber may be formulated with at least one hindered phenolic antioxidant selected from a monophenolic antioxidant, a bisphenolic antioxidant and a polyphenolic antioxidant in an amount of less than 10% by mass.

The heat insulating member may include a portion that extends along at least a surface of the lead located inside the pressure-resistant container and covers the lead except a tip end thereof.

The portion of the heat insulating member that covers the lead may be provided with an annular projection that surrounds an outer circumference of the heat insulating member.

The annular projection may have an outer diameter that matches an inner diameter of a connector which is connected to a wiring cord of an electric motor arranged inside the pressure-resistant container so as to prevent refrigerant and lubricating oil from entering inside the connector.

A plurality of annular projections may be provided.

The plurality of annular projections may be spaced from each other.

The heat insulating member may include a portion that covers a surface of the metal base that extends up to an inner wall of a terminal fixing hole provided on the pressure-resistant container after the hermetic terminal is fixed to the pressure-resistant container.

The heat insulating member may be provided to completely cover at least the entire surface of the hermetic terminal located inside the terminal fixing hole provided on the pressure-resistant container except the tip end of the lead located inside the pressure-resistant container, and the tip end may be inserted into a connector which is connected to a wiring cord of an electric motor arranged inside the pressure-resistant container.

The metal base may be provided with a plurality of through holes for screwing. The metal base may be provided with a plurality of sealing holes arranged in a straight line.

A pressure-resistant container may be equipped with any hermetic terminal mentioned above.

Advantageous Effects of Invention

According to the hermetic terminal according to an embodiment of the present disclosure, it is possible to prevent dew drops from being formed on the outer surface of the hermetic terminal.

DESCRIPTION OF EMBODIMENTS

A hermetic terminal according to the present disclosure includes a metal base that is provided with at least one sealing hole, a lead that is inserted in the sealing hole provided on the metal base, an insulating material that hermetically seals the metal base and the lead, and a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container.

If necessary, a predetermined surface of the heat insulating member may be provided with an annular projection that surrounds an outer circumference of the heat insulating member and has an outer diameter matching an inner diameter of a connector wired to an electric motor. Since the exposed surface of the hermetic terminal located inside the pressure-resistant container is covered with the heat insulating member, at least the metal surface of the hermetic terminal covered with the heat insulating member does not directly come into contact with the refrigerant. Since the surface of the metal base or the lead of the hermetic terminal located inside the pressure-resistant container is covered with the heat insulating member, it is not directly cooled by the refrigerant, which makes it possible to prevent dew drops from being formed on the outer surface of the hermetic terminal located outside the pressure-resistant container.

The heat insulating member according to the present invention is made of an electrical insulating material having refrigerant resistance and oil resistance. The heat insulating member is not particularly limited, and may be made of a material selected from rubber, elastomer and plastic, or a composite material or composite structural material containing the material selected from rubber, elastomer and plastic. As a material for the heat insulating member, for example, hydrogenated nitrile butadiene rubber (HNBR), ethylene-propylene-diene monomer (EPDM), epoxy resin, and polytetrafluoroethylene resin (PTFE) may be suitably used.

Carbon black may be added to a stabilizer that prevents deterioration in physical properties of the heat insulating member. However, if the added amount of carbon black is too great, the electrical insulation and the voltage resistance of the heat insulating member may be deteriorated. In the heat insulating member according to the present disclosure, the added amount of carbon black is reduced as much as possible in order to meet the requirements on the electrical insulation and the voltage resistance of the hermetic terminal. Generally, in the case of affording the refrigerant resistance and the oil resistance to HNBR, carbon black is added in the range of several percent to less than 10%, but the HNBR used in the heat insulating member for a hermetic terminal according to the present embodiment is carbon black free or contains a very small amount of carbon black in order to improve the electrical insulation. In other words, the amount of carbon black added to HNBR used in the hermetic terminal of the present embodiment was reduced more than usual. The HNBR is preferably formulated with at least one inorganic filler selected from silica and magnesium silicate in an amount of 1 to 5% by mass.

More preferably, the heat insulating member of the hermetic terminal may be formulated with at least one hindered phenolic antioxidant (aging inhibitor) selected from a monophenolic antioxidant having a basic skeleton that contains one phenolic hydroxyl group in one aromatic ring, a bisphenolic antioxidant having a basic skeleton that contains two aromatic rings and one phenolic hydroxyl group in each aromatic ring, and a polyphenolic antioxidant having basic skeleton that contains two phenolic hydroxyl groups in one aromatic ring in an amount of less than 10% by mass.

Figure 1:
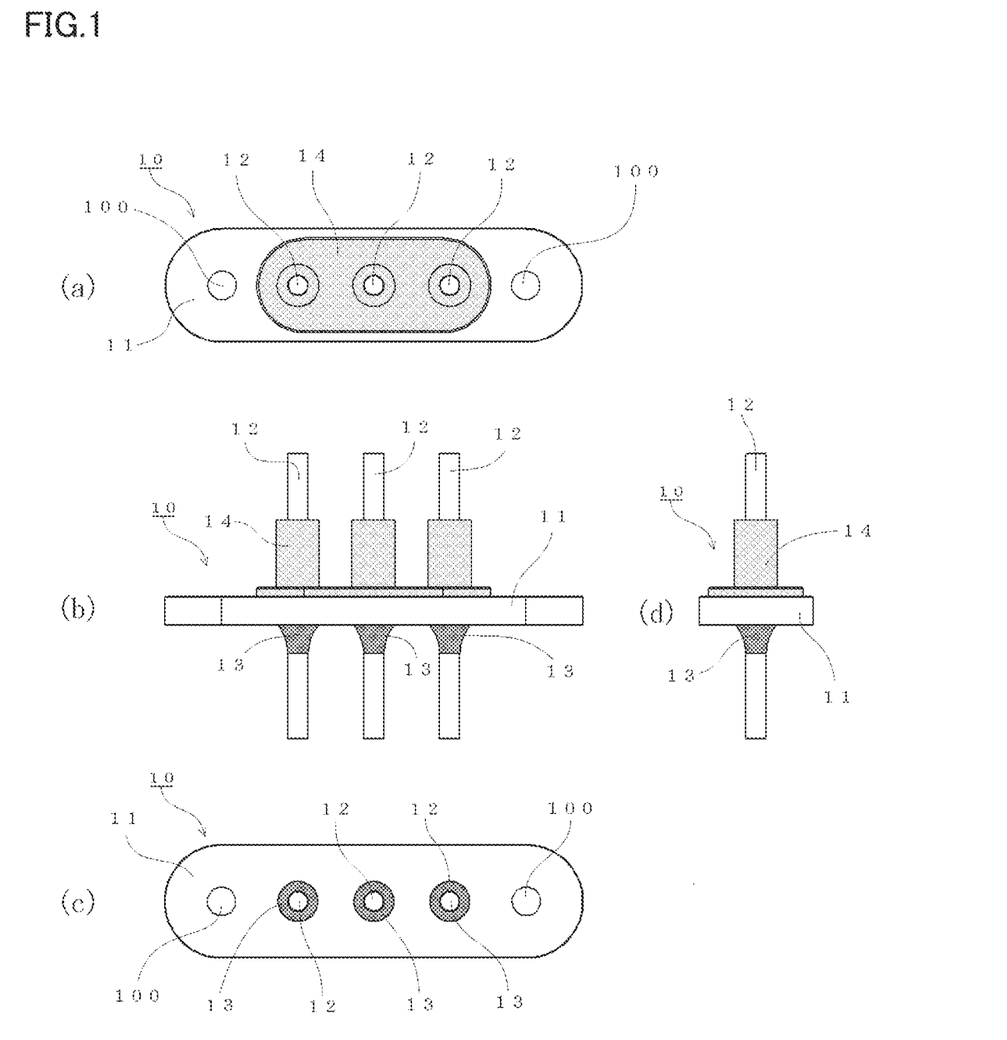
FIG. 1 illustrates a hermetic terminal 10 according to the present disclosure, wherein FIG. 1(*a*) is a plan view of the hermetic terminal viewed from an inner side thereof, FIG. 1(*b*) is a front view of the hermetic terminal, FIG. 1(*c*) is a bottom view of the hermetic terminal viewed from an outer side thereof, and FIG. 1(*d*) is a side view of the hermetic terminal.

As illustrated in FIG. 1, a hermetic terminal 10 of the present disclosure includes a metal base 11 that is provided with a sealing hole, a lead 12 that is inserted in the sealing hole provided on the metal base 11, a glass insulating material 13 that hermetically seals the metal base 11 and the lead 12, and a heat insulating member 14. After the hermetic terminal 10 is fixed to a pressure-resistant container 35, the heat insulating member 14 covers the surface of the metal base 11, the lead 12 and the insulating material 13 that are located inside the pressure-resistant container 35 and contact the refrigerant sealed therein.

Figure 3:
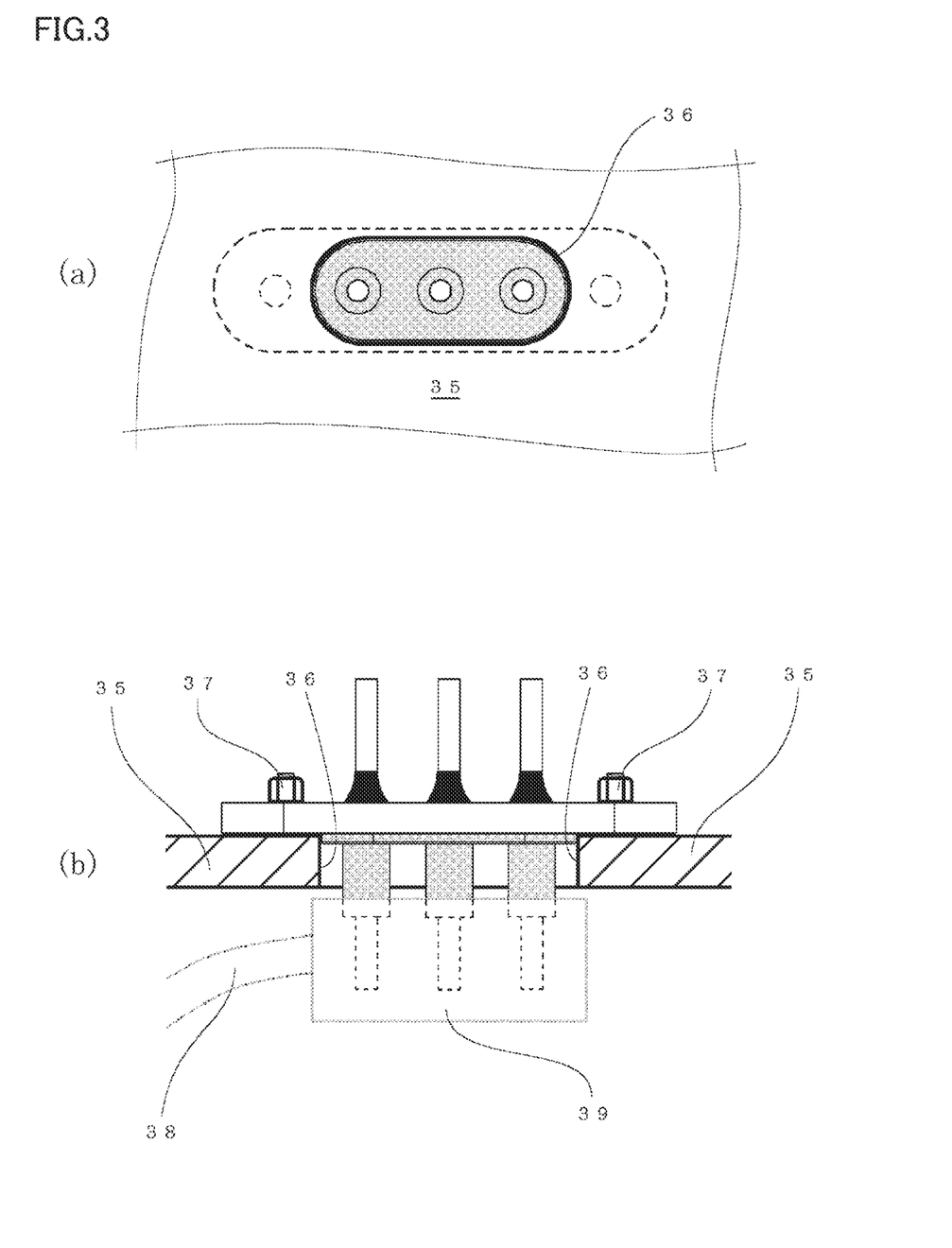
FIG. 3 illustrates the hermetic terminal according to the present disclosure after being fixed to the pressure-resistant container, wherein FIG. 3(*a*) is a plan view of the hermetic terminal viewed from the inner side of the pressure-resistant container and from which a connector of an electric motor is removed, and FIG. 3(*b*) is a partial cross-sectional view of the hermetic terminal viewed from the front side of the pressure-resistant container.

As illustrated in FIG. 3, the hermetic terminal 10 is hermetically fixed, via fixing means such as screws 37, in a terminal fixing hole 36 provided on the pressure-resistant container 35 that accommodates therein an electric motor together with the refrigerant and the lubricating oil.

A portion of the heat insulating member 14 that covers the lead 12 may be provided with an annular projection (denoted by a reference numeral 210 in FIG. 2) that surrounds the outer circumference of the heat insulating member 14. The annular projection has an outer diameter that matches the inner diameter of a connector 39 which is connected to a wiring cord 38 of the electric motor arranged inside the pressure-resistant container 35 so as to prevent the refrigerant and the lubricating oil from entering inside the connector 39.

By covering the exposed surface of the hermetic terminal 10 located inside the pressure-resistant container (see FIG. 1(a)) with the heat insulating member 14, the metal base 11 and the glass insulating material 13 of the hermetic terminal 10 is prevented from coming into contact with the refrigerant. In this case, the heat insulating member 14 is provided so as to completely cover at least the entire surface of the hermetic terminal 10 located inside the terminal fixing hole 36 provided on the pressure-resistant container 35 except the tip end of the lead 12 located inside the pressure-resistant container. Since the tip end of the inner lead 12 is entirely inserted into the connector 39 for connection to the electric motor, the surface of the metal base and the lead of the hermetic terminal 10 will not come into contact with the refrigerant and will not be cooled by the same. Thus, it is possible to prevent dew drops from being formed on the outer surface (FIG. 1(c)) of the hermetic terminal 10 located outside the pressure-resistant container. Certain effects may be obtained if the heat insulating member 14 is provided to cover a part of the surface of the hermetic terminal that comes into contact with the refrigerant and the lubricating oil inside the pressure-resistant container.

The heat insulating member 14 may be made of any material as long as it is an electrical insulating material having refrigerant resistance and oil resistance. For example, a rubber such as HNBR or EPDM may be suitably used as the material of the heat insulating member 14.

Generally, when the heat insulating member 14 is made of, for example, HNBR which has a slightly low electrical resistivity of $10^{11}$ Ω·cm, it is preferable that the HNBR is carbon black free or contains a very small amount of carbon black, and is formulated with at least one inorganic filler selected from silica and magnesium silicate in an amount of 1 to 5% by mass. Further, it is acceptable that the HNBR is further formulated with at least one hindered phenolic antioxidant selected from a monophenolic antioxidant, a bisphenolic antioxidant and a polyphenolic antioxidant in an amount of less than 10% by mass. By setting the composition of the HNBR in the heat insulating member 14 within the above range, the electrical resistivity of the HNBR may be improved to about $10^{15}$ Ω·cm.

According to the present disclosure, since at least a portion of the hermetic terminal 10 that comes into contact with the refrigerant is covered by the heat insulating member 14 which has refrigerant resistance, oil resistance and electrical insulation, it is possible to prevent dew drops from being formed and improve the tracking resistance, the electrical insulation and the voltage resistance of the hermetic terminal 10 by increasing the creeping distance between the metal base 11 and the lead 12 located inside the pressure-resistant container.

Further, in the hermetic terminal 10 of the present disclosure, as illustrated in FIG. 3, the outer diameter of the heat insulating member 14 covering the outer circumference of the lead 12 located inside the pressure-resistant container is made to match the inner diameter of the connector 39 to which the hermetic terminal 10 is fixed, it is possible to seal the connector so as to prevent lubricating oil (such as polyalkylene glycol (PAG) oil) or the like which has a low electrical insulation from entering inside the connector including a lead connection portion. Thus, it is possible to prevent the electrical insulation of the hermetic terminal 10 from being deteriorated by the lubricating oil.

Embodiments

As illustrated in FIG. 1, a hermetic terminal 10 according to a first embodiment of the present disclosure includes a metal base 11 which is made of carbon steel and is provided with a plurality of through holes 100 for screwing and three sealing holes arranged in a straight line, a lead 12 which is made of Fe—Cr iron-based alloy and inserted in each sealing hole provided on the metal base 11, an insulating material 13 which is made of borosilicate glass and is configured to hermetically seal the metal base 11 and the lead 12, and a heat insulating member 14. The heat insulating member 14 is made of HNBR and is configured to cover a partial surface of the metal base 11, the lead 12 and the insulating material 13 which are located inside the pressure-resistant container and come into contact with the refrigerant after the hermetic terminal 10 is fixed to the pressure-resistant container.

A portion of the heat insulating member 14 extends along the surface of the lead 12 located inside the pressure-resistant container (see FIG. 1(a)), and covers the lead 12 except the tip end thereof. The other portion of the heat insulating member 14 covers the entire surface of the insulating material 13, and extends beyond the edge of the sealing hole provided on the metal base 11 to cover a surface of the metal base 11 that extends up to the inner wall of the terminal fixing hole 36 of the pressure-resistant container 35 to which the hermetic terminal 10 is fixed.

Although the metal surface is exposed at the tip end of the lead 12 located inside the pressure-resistant container as illustrated in FIG. 1(a), the tip end is inserted into the connector 39 wired to the electric motor arranged inside the pressure-resistant container 35 as illustrated in FIG. 3, and thereby is not exposed to the outside during use. Since the exposed surface of the hermetic terminal 10 located inside the pressure-resistant container is entirely covered with the heat insulating member 14 made of HNBR, the refrigerant and the lubricating oil are prevented from coming into direct contact with the metal base 11 of the hermetic terminal 10 and the glass insulating material 13. Therefore, the surface of the metal base 11 and the lead 12 of the hermetic terminal 20 is not directly cooled by the refrigerant, which makes it possible to prevent dew drops from being formed on the outer surface of the hermetic terminal 10 located outside the pressure-resistant container (see FIG. 1(c)).

The HNBR of the heat insulating member 14 is carbon black free or contains a very small amount of carbon black, and is formulated with at least one inorganic filler selected from silica and magnesium silicate in an amount of 1 to 5% by mass, and is further formulated with at least one hindered phenolic antioxidant selected from a monophenolic antioxidant, a bisphenolic antioxidant and a polyphenolic antioxidant in an amount of less than 10% by mass to improve the electrical insulation. By increasing the creeping distance between the metal base 11 and the lead 12 located inside the pressure-resistant container, the tracking resistance, the electrical insulation and the voltage resistance may be improved.

Figure 2:
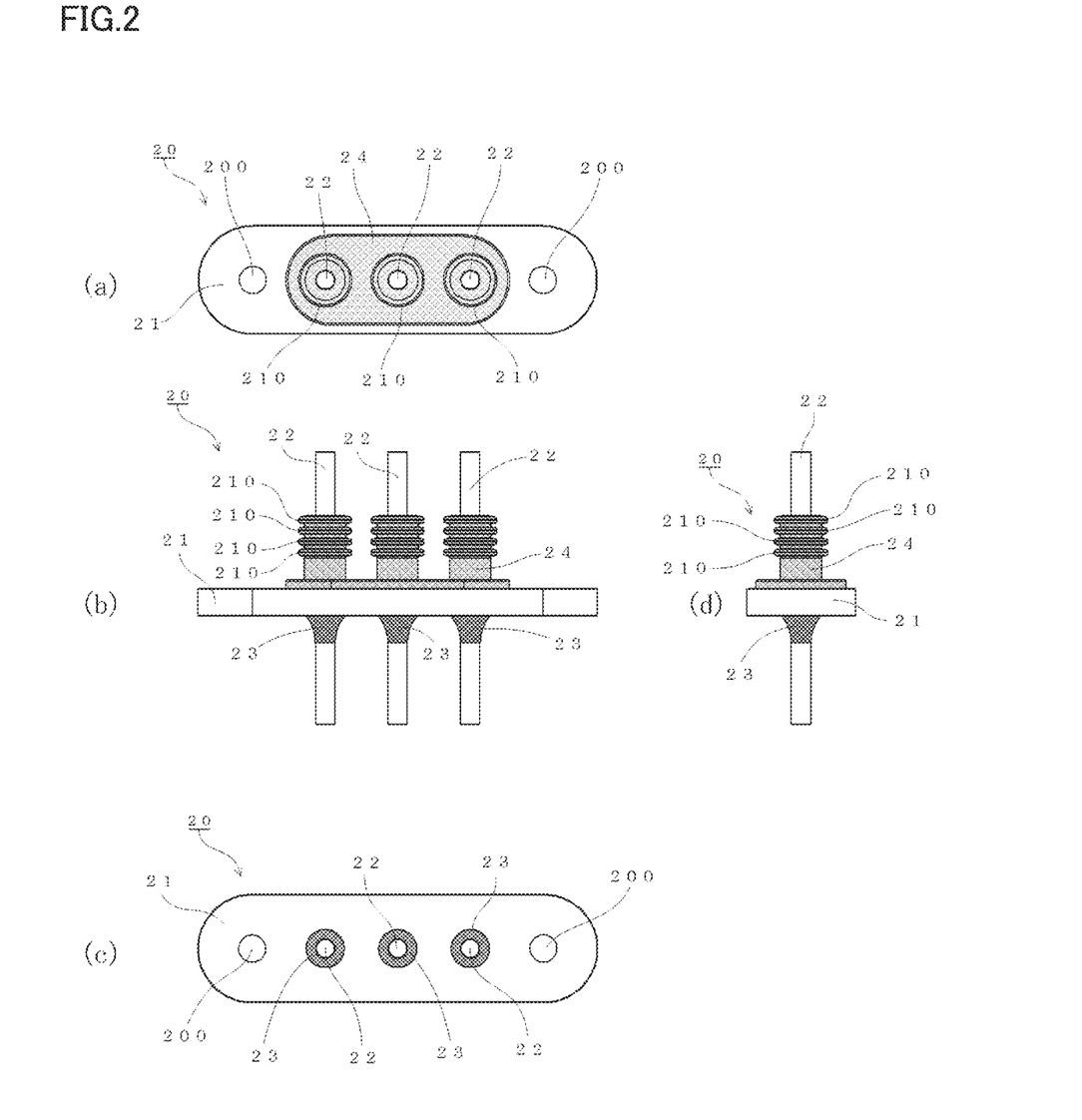
FIG. 2 illustrates a hermetic terminal 20 according to the present disclosure, wherein FIG. 2(*a*) is a plan view of the hermetic terminal viewed from an inner side thereof, FIG. 2(*b*) is a front view of the hermetic terminal, FIG. 2(*c*) is a bottom view of the hermetic terminal viewed from an outer side thereof, and FIG. 2(*d*) is a side view of the hermetic terminal.

As illustrated in FIG. 2, a hermetic terminal 20 according to a second embodiment of the present disclosure includes a metal base 21 which is made of carbon steel and is provided with a plurality of through holes 200 for screwing and three sealing holes arranged in a straight line, a lead 22 which is made of Fe—Cr iron-based alloy and inserted in each sealing hole provided on the metal base 21, an insulating material 23 which is made of soda barium glass and is configured to hermetically seal the metal base 21 and the lead 22, and a heat insulating member 24. The heat insulating member 24 is made of EPDM and is configured to cover a partial surface of the metal base 21, the lead 22 and the insulating material 23 which are located inside the pressure-resistant container and come into contact with the refrigerant after the hermetic terminal 20 is fixed to the pressure-resistant container.

A portion of the heat insulating member 24 extends along the surface of the lead 22 located inside the pressure-resistant container (see FIG. 2(a)), and covers the lead 22 except the tip end thereof. The other portion of the heat insulating member 24 covers the entire surface of the insulating material 23, and extends beyond the edge of the sealing hole provided on the metal base 21 to cover a surface of the metal base 21 that extends up to the inner wall of the terminal fixing hole 36 to which the hermetic terminal 20 is fixed.

The portion of the heat insulating member 24 that covers the lead 22 is provided with a plurality of annular projections 210 that surround the outer circumference of the heat insulating member 24 and are spaced from each other. The annular projection 210 has an outer diameter that matches an inner diameter of a connector to be wired to an electric motor arranged inside the pressure-resistant container to which the hermetic terminal 20 is fixed. The annular projection 210 prevents the refrigerant and the lubricating oil from entering inside the connector and prevents the connector from falling off.

Since the exposed surface of the hermetic terminal 20 located inside the pressure-resistant container is entirely covered with the heat insulating member made of EPDM, the refrigerant and the lubricating oil are prevented from coming into direct contact with the metal base 21 of the hermetic terminal 20 and the glass insulating material 23. Therefore, the surface of the metal base 21 and the lead 22 of the hermetic terminal 20 is not directly cooled by the refrigerant, which makes it possible to prevent dew drops from being formed on the outer surface of the hermetic terminal 20 located outside the pressure-resistant container (see FIG. 2(c)).

In the hermetic terminal 20 according to the second embodiment, since the heat insulating member 24 is made of EPDM, it has suitable refrigerant resistance, and especially oil resistance to polyol ester oil (POE). Further, the EPDM may increase the creeping distance between the metal base 21 and the lead 22 located inside the pressure-resistant container, which makes it possible to improve the tracking resistance, the electrical insulation and the voltage resistance.

As illustrated in FIG. 3, the hermetic terminal according to the present disclosure may be fixed in such a manner that after the lead is electrically connected to the electric motor accommodated in the pressure-resistant container 35, the hermetic terminal is inserted into the terminal fixing hole 36 provided on the pressure-resistant container 35 and is thereafter fastened with screws 37 or the like.

The lead of the hermetic terminal according to the present disclosure may be coated with a desired plating film on the surface. The lead and the metal base may be made of any metal material as long as it is suitable for the hermetic terminal. For example, the Fe—Cr alloy may be replaced by an Fe—Ni alloy, carbon steel, copper alloy, aluminum alloy, or the like.

Similarly, the insulating material described in the embodiments is not limited to soda barium glass, and any glass material may be used as long as it can electrically insulate and hermetically seal the lead and the metal base. A portion of the insulating material of the present disclosure may be made of a different glass material where necessary. The glass material may be partially or entirely replaced by a resin material such as epoxy resin.

It should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

INDUSTRIAL APPLICABILITY

The present disclosure is applicable to a hermetic terminal, especially a hermetic terminal for vehicles.

REFERENCE SIGNS LIST 10, 20: hermetic terminal; 11, 21: metal base; 12, 22: lead; 13, 23: insulating material; 14, 24: heat insulating member; 35: pressure-resistant container; 36: terminal fixing hole; 37: screw; 38: wiring cord; 39: connector; 100, 200: through hole; 210: annular projection

The invention claimed is:

1. A hermetic terminal comprising:
a metal base that is provided with at least one sealing hole;
a lead that is inserted in the sealing hole provided on the metal base;
an insulating material that hermetically seals the metal base and the lead; and
a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container; wherein
the heat insulating member is provided to completely cover at least an entire surface of the hermetic terminal located inside the terminal fixing hole provided on the pressure-resistant container except a tip end of the lead located inside the pressure-resistant container; and the tip end is configured to be inserted into a connector which is connected to a wiring cord of an electric motor arranged inside the pressure-resistant container.

2. The hermetic terminal according to claim 1, wherein the heat insulating member is made of an electrical insulating material having refrigerant resistance and oil resistance.

3. The hermetic terminal according to claim 1, wherein the heat insulating member is made of a material selected from rubber, elastomer and plastic, or a composite material or a composite structural material containing the material selected from rubber, elastomer and plastic.

4. The hermetic terminal according to claim 1, wherein the heat insulating member is made of plastic selected from epoxy resin and polytetrafluoroethylene resin (PTFE).

5. The hermetic terminal according to claim 1, wherein the heat insulating member is made of rubber selected from hydrogenated nitrile butadiene rubber (HNBR) and ethylene-propylene-diene monomer (EPDM).

6. The hermetic terminal according to claim 5, wherein the rubber constituting the heat insulating member is carbon black free or contains a very small amount of carbon black.

7. The hermetic terminal according to claim 6, wherein the rubber is formulated with at least one inorganic filler selected from silica and magnesium silicate in an amount of 1 to 5% by mass.

8. The hermetic terminal according to claim 6, wherein the rubber is formulated with at least one hindered phenolic antioxidant selected from a monophenolic antioxidant, a bisphenolic antioxidant and a polyphenolic antioxidant in an amount of less than 10% by mass.

9. The hermetic terminal according to claim 1, wherein the heat insulating member includes a portion that extends along at least a surface of the lead located inside the pressure-resistant container and covers the lead except the tip end thereof.

10. The hermetic terminal according to claim 9, wherein the portion of the heat insulating member that covers the lead is provided with an annular projection that surrounds an outer circumference of the heat insulating member.

11. The hermetic terminal according to claim 10, wherein the annular projection has an outer diameter that matches an inner diameter of a connector which is connected to a wiring cord of an electric motor arranged inside the pressure-resistant container so as to prevent refrigerant and lubricating oil from entering inside the connector.

12. The hermetic terminal according to claim 10, wherein a plurality of annular projections are provided.

13. The hermetic terminal according to claim 12, wherein the plurality of annular projections are spaced from each other.

14. The hermetic terminal according to claim 1, wherein the heat insulating member includes a portion that covers a surface of the metal base that extends up to an inner wall of a terminal fixing hole provided on the pressure-resistant container after the hermetic terminal is fixed to the pressure-resistant container.

15. The hermetic terminal according to claim 1, wherein the metal base is provided with a plurality of through holes for screwing.

16. The hermetic terminal according to claim 1, wherein the metal base is provided with a plurality of sealing holes arranged in a straight line.

17. A pressure-resistant container equipped with a hermetic terminal comprising:

a metal base that is provided with at least one sealing hole;

a lead that is inserted in the sealing hole provided on the metal base;

an insulating material that hermetically seals the metal base and the lead; and a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container; wherein (1) the heat insulating member is provided to completely cover at least an entire surface of the hermetic terminal located inside the terminal fixing hole provided on the pressure-resistant container except a tip end of the lead located inside the pressure-resistant container, and the tip end is configured to be inserted into a connector which is connected to a wiring cord of an electric motor arranged inside the pressure-resistant container; or (2) the heat insulating member is made of rubber selected from hydrogenated nitrile butadiene rubber (HNBR) and ethylene-propylene-diene monomer (EPDM), and the rubber constituting the heat insulating member is carbon black free or contains a very small amount of carbon black; or (3) the heat insulating member includes a portion that extends along at least a surface of the lead located inside the pressure-resistant container and covers the lead except a tip end thereof, the portion of the heat insulating member that covers the lead is provided with an annular projection that surrounds an outer circumference of the heat insulating member, and the annular projection has an outer diameter that matches an inner diameter of a connector which is connected to a wiring cord of an electric motor arranged inside the pressure-resistant container so as to prevent refrigerant and lubricating oil from entering inside the connector.

18. A hermetic terminal comprising:

a metal base that is provided with at least one sealing hole;

a lead that is inserted in the sealing hole provided on the metal base;

an insulating material that hermetically seals the metal base and the lead; and a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container; wherein the heat insulating member includes a portion that extends along at least a surface of the lead located inside the pressure-resistant container and covers the lead except a tip end thereof;

the portion of the heat insulating member that covers the lead is provided with an annular projection that surrounds an outer circumference of the heat insulating member; and the annular projection has an outer diameter that matches an inner diameter of a connector which is connected to a wiring cord of an electric motor arranged inside the pressure-resistant container so as to prevent refrigerant and lubricating oil from entering inside the connector.

19. The hermetic terminal according to claim 18, wherein the heat insulating member is made of a material selected from rubber, elastomer and plastic, or a composite material or a composite structural material containing the material selected from rubber, elastomer and plastic.

20. The hermetic terminal according to claim 18, wherein the heat insulating member is made of plastic selected from epoxy resin and polytetrafluoroethylene resin (PTFE).

21. The hermetic terminal according to claim 18, wherein the heat insulating member is made of rubber selected from hydrogenated nitrile butadiene rubber (HNBR) and ethylene-propylene-diene monomer (EPDM).

22. The hermetic terminal according to claim 21, wherein the rubber constituting the heat insulating member is carbon black free or contains a very small amount of carbon black.

23. The hermetic terminal according to claim 18, wherein a plurality of annular projections are provided.

24. The hermetic terminal according to claim 23, wherein the plurality of annular projections are spaced from each other.

25. The hermetic terminal according to claim 18, wherein the metal base is provided with a plurality of sealing holes arranged in a straight line.

26. A hermetic terminal comprising:
a metal base that is provided with at least one sealing hole;
a lead that is inserted in the sealing hole provided on the metal base;
an insulating material that hermetically seals the metal base and the lead; and
a heat insulating member that is provided to cover at least a partial surface of the hermetic terminal which is located inside a pressure-resistant container after the hermetic terminal is fixed to the pressure-resistant container and comes into contact with refrigerant sealed in the pressure-resistant container; wherein
the heat insulating member is made of rubber selected from hydrogenated nitrile butadiene rubber (HNBR) and ethylene-propylene-diene monomer (EPDM); and
the rubber constituting the heat insulating member is carbon black free or contains a very small amount of carbon black.

27. The hermetic terminal according to claim 26, wherein the rubber is formulated with at least one inorganic filler selected from silica and magnesium silicate in an amount of 1 to 5% by mass.

28. The hermetic terminal according to claim 26, wherein the rubber is formulated with at least one hindered phenolic antioxidant selected from a monophenolic antioxidant, a bisphenolic antioxidant and a polyphenolic antioxidant in an amount of less than 10% by mass.

* * * * *